United States Patent

[11] 3,563,224

| [72] | Inventors | Denis William Bryer<br>New Malden;<br>Leslie Woodgate, Hampton, England |
|---|---|---|
| [21] | Appl. No. | 769,324 |
| [22] | Filed | Oct. 21, 1968 |
| [45] | Patented | Feb. 16, 1971 |
| [73] | Assignee | National Research Development Corporation<br>London, England<br>a corporation of Britain |
| [32] | Priority | Oct. 26, 1967 |
| [33] | | Great Britain |
| [31] | | 48805/67 |

[54] SMOKE GENERATORS
6 Claims, 4 Drawing Figs.

[52] U.S. Cl. ................................................. 126/59.5

[51] Int. Cl. ................................................. A01g 13/06
[50] Field of Search ...................................... 126/59.5;
431/208

[56] References Cited
UNITED STATES PATENTS
3,447,532  6/1969  Poppendiek ............... 126/59.5X
FOREIGN PATENTS
519,692  3/1955  Italy ........................... 431/208

Primary Examiner—Charles J. Myhre
Attorney—Cushman, Darby & Cushman

ABSTRACT: A smoke generator including ducting for connecting a supply of smoke producing liquid to a discharge aperture and heating means for vaporization of said liquid, the heating means being within the ducting and associated with the discharge aperture.

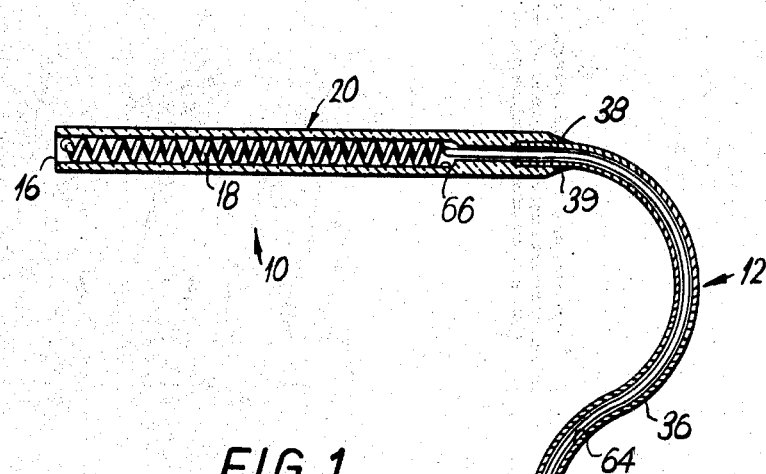
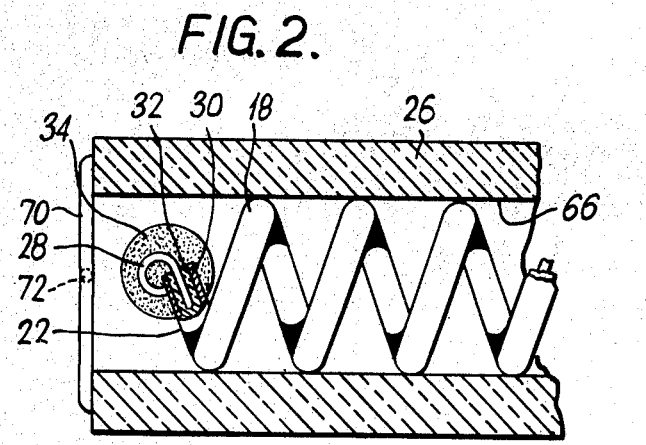
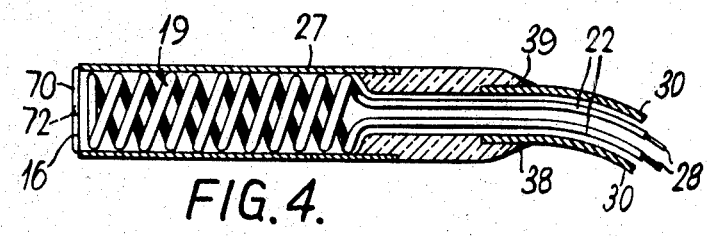

SMOKE GENERATORS

This invention relates to "smoke" generators and in particular to "smoke" generators for use in wind tunnels or the like.

By "smoke" in this specification is meant a suspension of a liquid in a gas.

Smoke generators are already known in which a mixture of carbon dioxide and oil spray is heated and ejected through a narrow jet to atmosphere. These generators are often used in the theatre for example or for testing model funnels and chimneys. They are not suitable however in cases where they cannot be located close to or inside the object under test and in particular are unsatisfactory where ducting must be employed to lead smoke from the generator to an appropriate point upstream of the object under test, as for example where the latter is undergoing tests in a wind tunnel.

Smoke generators are also known in which paraffin oil is vaporized and lead to a point upstream of the object under test by means of ducting. On being discharged from the ducting the vaporized oil is cooled by the ambient atmosphere to condense into droplets forming the smoke and this is swept towards the object under test by an appropriate gas flow. These generators are designed for wind tunnel work but since at least that part of the ducting actually located in the wind tunnel tends to be cooled by the ambient atmosphere there, heating coils must be provided which heat the ducting to a sufficiently high temperature to avoid any likelihood of the oil condensing before it has been entrained into the wind tunnel by the gas flow.

Smoke generators are known too in which ducting leading to the smoke discharge point is itself heated. These generators are designed for wind tunnel work and attempt to overcome the objections of the previous generator by using the ducting to vaporize and maintain vaporization of the oil until discharge. This means however that a large length of ducting is necessary to produce the necessary amount of heating for vaporization and this in turn involves the use of heavy electrical equipment to provide the corresponding large electrical heating current required.

According to the present invention a smoke generator includes ducting for connecting a supply of smoke producing liquid to a discharge aperture and heating means for vaporization of said liquid, the heating means being within the ducting and associated with the discharge aperture.

Preferably, the heating means are located in the ducting.

In one embodiment of the invention, heating means comprise a coil of coaxial wire in the inner and outer conductors of which are electrically connected together in the vicinity of the aperture.

In another embodiment of the invention, the heating means comprise a coaxial wire wound back on itself in the form of a double helix the bight of which is in the vicinity of the aperture. In a preferred form of this embodiment the outer conductor of the coaxial wire is grounded and at least that portion of the ducting containing the heater means is made of stainless steel.

Conveniently, the heating means has a housing or casing with a swan-necked first section leading into and lying in substantially the same plane as a substantially linear second section which provides the discharge aperture at its free end. The length of this linear section is conveniently not more than about three times the radius of curvature of swan-necked section. In a preferred form, the exterior surfaces of the first and second sections of the housing or casing are interconnected by fairing profiled to encourage in operation a smooth flow of ambient gas over the walls of said second section, to keep the boundary layer thickness from increasing to a high value adjacent the discharge aperture, and to discourage breakaway of this layer from the external walls of said second section. Thus the fairing may have a semielliptical shape, for example.

According to another aspect, the invention also includes a rake of the new smoke generators adapted to be fed in parallel from a common source of smoke-producing liquid.

The smoke-producing liquid is conveniently oil e.g. paraffin oil. Shell Odina 17 oil is especially suitable.

In order that the invention may be more fully understood, an embodiment thereof will now be described, by way of example, with reference to the accompanying diagrammatic drawings in which:

FIG. 1 shows side view of a smoke generator according to the present invention;

FIG. 2 shows, on an enlarged scale, a detail of that part of the generator indicated by the line "A" in FIG. 1;

FIG. 4 shows part of a smoke generator using an alternative form of heater coil.

Figure 3:
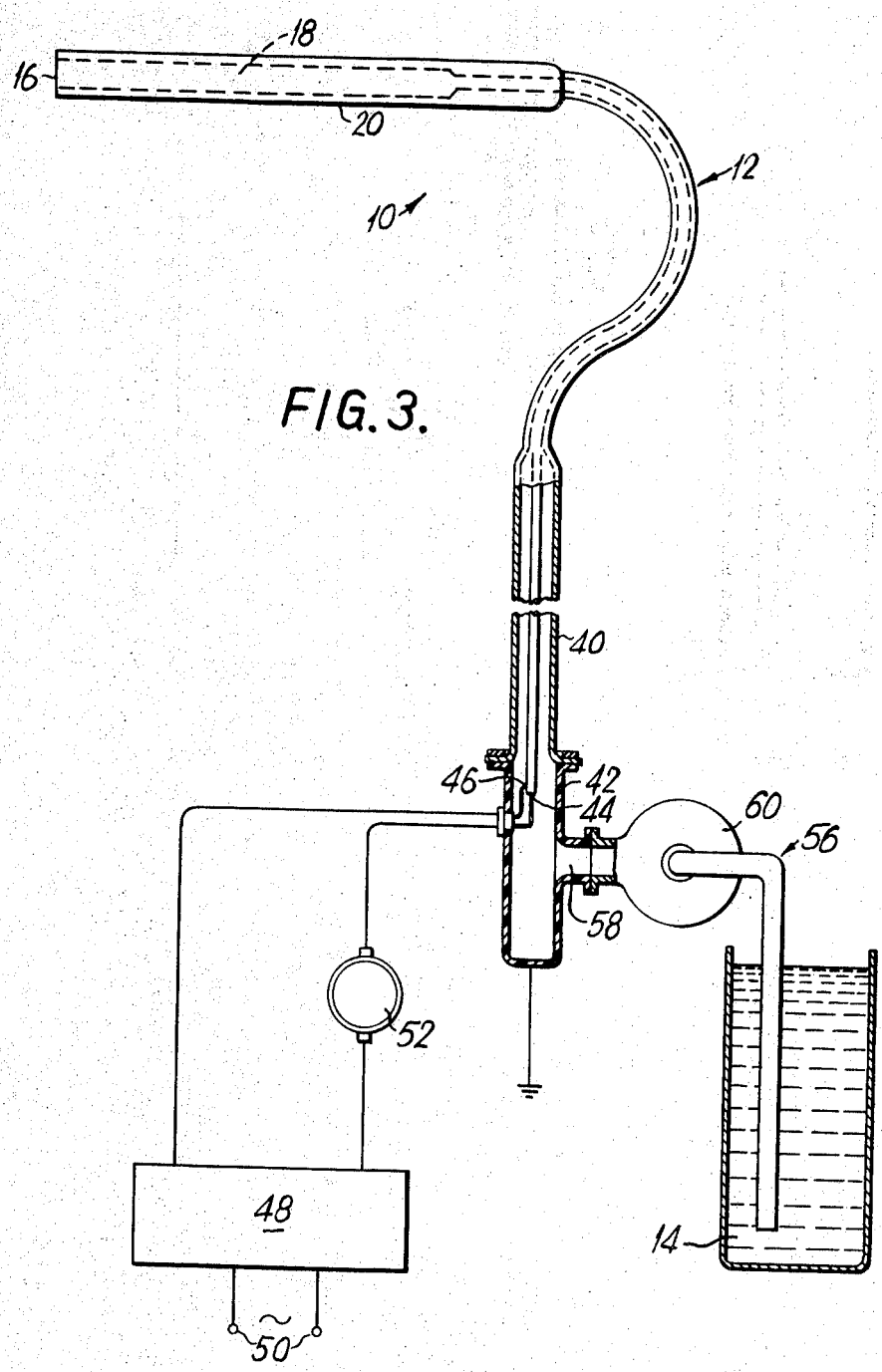
FIG. 3 shows the generator of FIGS. 1 and 2 connected up with the appropriate electrical circuitry for the heater, and with the supply of oil to be vaporized.

Thus referring to FIGS. 1 to 3, a smoke generator 10 includes ducting 12 connecting a supply tank 14 of paraffin oil with an appropriate discharge aperture 16. A heater coil 18 is located in the end section 20 of the ducting 12 adjacent the discharge aperture 16.

The structure of the coil 18 is best shown in FIG. 2 from which it will be seen that the coil comprises a coaxial wire 22 wound in a helix which is located within a ceramic tube 26 forming the linear end section 20 of the ducting 12. The wire 22, which is easily interchangeable, comprises an inner conductor 28 which is connected adjacent the discharge aperture 16 with a sheath 30 providing a return path for the heating current. The sheath 30 is spaced from the conductor 28 by an intervening layer of electrical insulator 32. A convenient form of coaxial wire is marketed under the name Thermocoax for example. In this the inner conductor is made of nickel chrome, the sheath of stainless steel and the insulator is magnesia powder. The insulator 32 is protected from the effects of the oil vapor produced in the tube 26 during operation of the generator, by a hardened blob 34 of jeweller's glaze which seals the free end of the wire 22 and the connection between the conductor 28 and sheath 30. The coaxial wire then passes from the inner end of the coil 18 through a swan-necked section 36 of the ducting which section is connected at its upper end to the linear section 26 by a profiled fairing 38 of semielliptical form optionally having a fillet 39. The lower end of the ducting section 36 continues downwardly as a support section 40 which is connected at its lower end with an earthed insulating chamber 42 containing terminals 44 and 46 to which conductor 28 and sheath 30 are respectively led. The terminals 44 and 46 are connected across a variable transformer 48 which is fed by an AC supply 50. An ammeter 52 is included between the transformer 48 and the terminal 44.

The oil circuit for the smoke generator includes the tank 14 which is connected by tubing 56 with an oil inlet 58 of the chamber 42. A flow inducer pump 60 is included between the tank 14 and the chamber 42. The oil path to the discharge point 16 is thereafter provided by the bores 62, 64 and 66 of the respective ducting portions 40, 36 and 20.

Repeated use of the generator may result in the coil 18 being significantly extruded by the action of the liquid flow in the section 20 on the hot and therefore at the time relatively soft metal of the coil. To avoid the coil projecting beyond the open end of section 20, at least when heated, after prolonged use of the generator, the coil 18 is therefore preferably located against excessive axial movement along the ducting. In the embodiment of FIGS. 1 to 3 (and that of FIG. 4), this is done by wires 70, 72 which are spot welded across the open end of the ducting section 20.

In operation of the generator, at least the ducting sections 26 and 36 are normally located in a wind tunnel with the discharge aperture 16 facing the object under test. The electrical connections to the terminals 44 and 46 are then established and the pump 60 is energized to pump oil from the tank 14 until it appears at the aperture 16. When this happens, the pump 60 is stopped and the output of transformer 48 across the terminals 44 and 46 is increased until smoke is detected in the wind tunnel.

Thereafter the pump 60 is restarted and the pumping rate and electric current are adjusted until smoke of the desired quality is obtained. It is advisable when stopping the generator to switch off the heating current before the oil pump. It is pointed out that since the ducting sections 36 and 40 carry the oil in its liquid state no heating or lagging of these sections is necessary.

Oil vapor issuing from the discharge aperture 16 is condensed to form smoke in the cooler ambient atmosphere of the wind tunnel and is entrained into this atmosphere to form a fine plume of smoke by a gas flow moving over the terminal part of the end section 20 of the ducting. Where the object under test is to be tested under still air conditions, this gas flow may be produced by an additional tube (not shown) mounted coaxially with the terminal part of section 20 and connected at its end remote from the aperture 16 with a supply (not shown) of air or carbon dioxide. In alternative arrangements (not shown) the coaxial additional tube is replaced by one or more tubes extending along the curved surface of the section 20 or directed across the discharge aperture 16. Where the object concerned is to be tested under dynamic air conditions, the wind tunnel air (or other gas) sweeping past the aperture 16 will entrain the generator smoke into the gas flow. In this latter case the fairing 38 is particularly important because it encourages a smooth flow of the ambient gas over the walls of the ducting section 20, it discourages breakaway of this layer from the walls of the section 20, and it keeps the boundary layer thickness from increasing to a high value adjacent the aperture 16. These three factors promote the production of a fine concentrated plume of smoke from the generator instead of a widely dispersed discharge as might otherwise be the case. Laminar flow is also encouraged by the relatively short length (typically about 13 cm.) of the ducting section 20 in that the length and hence the effectiveness of the boundary layer about the section 20 are correspondingly low. The coaxial nature of the wire 22 allows satisfactory heating to be achieved in spite of this shortness however. This advantage is further utilized in another embodiment (FIG. 4) of the invention in which the ceramic tube 26 is replaced by an even shorter length (typically about 7 cm.) of stainless steel tubing (27) and the coil 18 is replaced by a coil 19 of correspondingly shortened axial extent in which the same length of conductor 28 is achieved as in the previous embodiment by winding the wire 22 back on itself in a double helix. The embodiment of FIG. 4 has the further advantage that the electrical connections for the coil can now be made to the two ends of the conductor 28 so that the sheath 30 can be earthed independently of the AC supply. An important result of grounding the sheath 30 is that the ducting section 20 may now be made of metal if desired and yet still act as a support for the coil 18. Thus the sheath 30 is conveniently of stainless steel and may be made with thinner walls than was the case with the ceramic tube 26 of the previous embodiment. The advantage of a thin-walled section 20 is that the generated vapor is close to the surrounding atmosphere or gas stream at the point of exit of the vapor from the generator. This encourages a rapid mixing of the smoke into the surrounding atmosphere or gas stream.

The ducting section 36 is also designed to reduce possible interference of this section with the laminar flow of ambient gas through the wind tunnel. This is achieved by the swan-necked shaping of the section which results in the wake produced by its lower half being dragged downwards by the sloping surfaces of that half away from the top ducting section 20. Thus the wake effects of the section 36 on the air flow past the top section 20 are restricted to those produced by only the upper half of the section 36.

If desired, the single ducting 12 may be replaced by a rake of laterally aligned ducts fed in parallel from the oil tank 14. Other multiduct assemblies are also possible depending on the particular requirements imposed in testing the object concerned. If a single ducting system is used however, exactly the same effect as a multiduct arrangement may be achieved by varying the position of the small ducting in the wind tunnel and superimposing the different flow patterns indicated by the generator smoke on a single representation of the results. This latter course is clearly a more lengthy process than if a plurality of ducts are used but it does have the compensating advantages of producing less disturbance in the flow of the ambient gas in the wind tunnel towards the object under test.

In alternative embodiments (not shown) of the invention, the embodiments above described are modified by the use of a simple wire e.g. michrome wire (as opposed to a coaxial wire) for the heating coil. In these modifications, the return path for the heating current is provided by a length of wire passing axially back down the coil from the vapor discharge end to the inner end of the section 20. Adequate insulation must of course be provided between this length of wire and the surrounding coils if shorting is to be avoided.

An important property of the invention is that the generator can be used satisfactorily even when the surrounding gas flows are of relatively high velocity. In the embodiment of FIG. 4 for example, a satisfactory performance may be achieved with gas flows of 200 ft./sec. or more.

We claim:

1. A smoke generator including aperture-defining means providing a discharge aperture for the smoke, connection means adapted for connection with a supply of liquid to be vaporized, ducting, between said aperture defining means and said connection means, for conducting said liquid towards said discharge aperture, and liquid vaporizing heat means within the ducting, said heating means being associated with said discharge aperture, wherein the heating means comprise a coil of coaxial wire and an electrical connection between the inner and outer conductors of said wire in the vicinity of the aperture.

2. A smoke generator including aperture defining means providing a discharge aperture for the smoke, connection means adapted for connection with a supply of liquid to be vaporized, ducting, between said aperture defining means and said connection means, for conducting said liquid towards said discharge aperture, and liquid vaporizing heating means within the ducting, said heating means being associated with said discharge aperture, wherein the heating means comprise a coaxial wire wound back on itself in the form of a double helix the bight of which is in the vicinity of said aperture.

3. A smoke generator as claimed in claim 2 in which the outer conductor of the coaxial wire is grounded and at least that part of the ducting containing the heating means is made of stainless steel.

4. A smoke generator including aperture defining means providing a discharge aperture for the smoke, connection means adapted for connection with a supply of liquid to be vaporized, ducting between said aperture defining means and said connection means for conducting said liquid towards said discharge aperture, liquid vaporizing heating means within the ducting, said heating means being associated with said discharge aperture, and said ducting including a housing or casing for the heater means, said housing or casing having a swan-necked first section and a substantially linear second section lying in substantially the same plane as said swan-necked section, said swan-necked section leading into one end of the linear section and the other end of said linear section providing said discharge aperture.

5. A smoke generator as claimed in claim 4 wherein the length of the first section is not more than about three times the radius of curvature of the swan-necked section.

6. A smoke generator as claimed in claim 4 comprising profiled fairing interconnecting the exterior surface of the first and second sections of the heater means, said fairing having a semielliptical shape tapering from the linear section towards the swan-necked section.